Patented May 22, 1945

2,376,807

UNITED STATES PATENT OFFICE 2,376,807

PROCESS OF MAKING LUBRICANTS

Mathias Pier, Heidelberg, and Friedrich Christmann, Ludwigshafen - on - the - Rhine, Germany; vested in the Alien Property Custodian No Drawing. Application December 2, 1937, Serial No. 177,745, which is a division of application Serial No. 651,802, January 14, 1933. Divided and this application March 27, 1940, Serial No. 326,156. In Germany February 6, 1932

5 Claims. (Cl. 204—168)

The present invention is concerned with the production of lubricants, more particularly with the production of substances which are either good lubricants themselves or which are valuable improving agents for other lubricants.

We have found that particularly valuable lubricating oils are obtained by subjecting the said paraffin waxes or similar waxes rich in hydrogen or mixtures containing the same, for example mixtures with hydrocarbon oils rich in hydrogen (petrolatum) or with fats, fatty oils, other waxes, high molecular alcohols or esters or acids, such as stearic acid, palmitic acid or oleic acid, to condensation by means of the action of silent electric discharges. The condensation products thus obtained may also be employed with advantage as additions to lubricating oils. They have the effect of improving the properties of the latter; in particular the pour point of the lubricating oils is lowered to an appreciable degree. By the term paraffin wax we means paraffin wax from any origin, as for example from mineral oils or from brown coal, as well as waxes consisting of solid isoparaffins (by which we mean paraffinic hydrocarbons having branched carbon chains), as for example Palembang wax, or dehydrogenated paraffin waxes, which may be dehydrogenated by heat-treatment, such as, preferably slight, cracking or by introducing into the initial paraffin wax an exchangeable substituent, such as a halogen or sulphur or oxygen, and subsequently splitting off the hydride of the said substituent at an elevated temperature, preferably in the presence of a catalyst.

The said treatment of paraffin waxes or similar waxes with silent electric discharges is hereinafter referred to as "voltolization."

We have further found that by suitable modifications or special modes of proceeding the results arrived at by the said voltolization may be considerably improved.

Careful investigation of the phenomena occurring in the voltolization of hydrocarbon materials has led us to the conclusion that products having particular advantages for the purposes hereinbefore described are obtained by subjecting to the voltolization initial materials having certain well defined characteristics not inherent in the other members of the aforesaid class of initial materials used for the treatment with silent electric discharges.

Thereafter we found that also initial materials which do not possess the aforesaid characteristics, on being suitably pretreated, and then subjected to voltolization will yield the same valuable results as when employing the said peculiar initial materials.

We further found that the products obtained by the voltolization treatment of any hydrocarbon materials often contain constituents which more or less substantially impair their properties, and we developed processes for what may be termed "immunization," i. e., the removal or otherwise rendering harmless of the said obnoxious constituents contained in the voltolization products.

We further discovered that by carrying through the voltolization treatment under quite specific conditions products may be obtained possessing one or the other quite peculiar characteristic which therefore are particularly valuable under certain circumstances.

The properties of the voltolization products obtained according to the present invention vary to a more or less substantial extent with the nature of the initial materials subjected to voltolization, with the conditions employed for the voltolization treatment and also with the nature of the further treatment of the crude products resulting from the treatment with silent electric discharges. In view of these varying properties the products obtained according to our present invention may be used as lubricants, i. e., lubricating oils or greases, or when being less suitable for direct use as lubricants, they are highly valuable agents for improving other lubricants, imparting to the latter particularly valuable properties. Our present invention is also concerned with such compositions containing voltolization products as improving agents.

More specifically, it is an object of the invention to provide a process for after-treating and improving the products of voltolization obtained by the procedures described in detail in our copending applications Serial No. 651,802, filed January 14, 1933, now U. S. Patent 2,197,768, issued April 23, 1940, and Serial No. 177,745, filed December 2, 1937, now U. S. Patent 2,197,769, issued April 23, 1940.

The method of treating initial materials of the kind described above will however be explained further by way of two specific Examples.

Example 1

Ceresine having a melting point of 73° C. is treated at temperatures above its melting point, as for example at from 80° to 100° C., in a Siemens ozonization tube under a pressure of from about 5 to 10 millimeters (mercury gauge) with electric discharges at about 7000 volts and 1000 cycles for from 25 to 30 hours, the same amount of hard paraffin wax having a melting point of 50° C. being added as a diluent after from 20 to 22 hours. The resulting mixture is then subjected to a vacuum steam distillation up to 280° C. whereby the added paraffin wax and any products of low boiling point formed are distilled off.

Example 2

A paraffin wax obtained from a mineral oil and which has a mean molecular weight of 340 is treated in the fused state at between about 80° and 100° C. in a Siemens ozonization tube for about 10 hours with electric discharges at about 7000 volts and 10000 Hertz while maintaining a vacuum of about 10 millimeters mercury gauge. A salve like product is thus obtained from which by subsequent distillation in vacuo at about 270° C. an oil having a viscosity of 16° Engler at 99° C. is obtained.

As has been pointed out above we have found that the products resulting from the voltolization treatment can be improved by subjecting them to an after-treatment more particularly with a view to "immunize" obnoxious constituents which are mostly present in these products. They often contain more or less substantial amounts of paraffin hydrocarbons of the order of those present in ordinary soft or hard paraffin wax or of a still higher order. We have therefore attempted to improve the crude products by removing therefrom such paraffin wax hydrocarbons, for example by freezing them out. It has been found, however, that while such treatment often leads to a very substantial improvement of the crude voltolization products it does not render them free from objectionable matter in all cases. Further investigation has revealed the fact that during the voltolization treatment comparatively large quantities of products of middle oil character are formed and that it is due to such constituents of middle oil character that the voltolization products hitherto known and often also those obtained as hereinbefore described do not meet all requirements of practice. We have therefore found it necessary to "immunize" not only paraffin wax hydrocarbons but also middle oils either by removing both kinds of substances or by removing only the constituents of middle oil character and otherwise rendering harmless the paraffin wax hydrocabons.

By the presence of these substances in the voltolization products the high quality of the latter (the tests of which are much better than those of the natural or synthetic lubricants hitherto known) is appreciably affected. The voltolization products are impaired by the said substances in particular as regards their flash point, their setting point, their viscosity and their capacity of forming films. If, however, the voltolization products are subjected to the aforesaid "immunization," products having excellent properties are obtained; for example the films formed therefrom are only difficultly broken even if two parts of a machine are pressing with a high pressure against each other. The said after-treatment is also of particular advantage in case the voltolization products are to be employed for improving other lubricating oils since the effect attained by a certain amount of such product is considerably greater than the effect obtained by the same amount of a voltolized product which has not been subjected to the said after-treatment, in particular as regards the lowering of the pour point, the improvement of the viscosity index and the capacity of forming films.

The "immunization" or removal of the obnoxious substances present in the crude voltolization products may be effected by means of an extraction process in which hydrocarbons gaseous at ordinary temperature which have been liquefied by cooling and/or the application of elevated pressure are preferably used as extraction agents.

For this purpose the voltolization product is mixed with from 4 to 6 times the amount of liquefied gaseous hydrocarbons as for example methane, ethane, propane, butane, ethylene, propylene or mixtures thereof. It is preferable to employ propane or ethane or mixtures of propane and ethane. The said treatment is effected in a vessel capable of withstanding elevated pressures whereby a pressure prevails which is equal to the vapor pressure of the particular liquefied hydrocarbons or of the particular mixture of liquefied hydrocarbons at the working temperature, which is either ordinary or slightly reduced temperature. In this manner the lower molecular constituents present in the voltolization product are dissolved by the solvent while the valuable portion of this product remains undissolved. The two layers formed are then separated. By lowering the temperature stepwise, products having different characteristics may be precipitated from the solution in the liquefied hydrocarbons.

It is also possible to dilute the crude voltolization products with lower molecular hydrocarbons such as gasoline or kerosene or the like, then to cool the mixture and to remove the substances, in particular the paraffin waxes which have been separated out.

In this case the voltolization product is preferably diluted with benzine or illuminating oil or with halogenated hydrocarbons such as trichloroethane, then cooled to a temperature between 8° and 30° below zero C. whereby the paraffin wax contained in the crude product is precipitated, the latter then being filtered or centrifuged. The solution containing the valuable constituents of the voltolization product and the low boiling constituents thereof is then freed by distillation from the diluent and from the said low boiling constituents. This product may also be first freed from the low boiling constituents and from the bulk of the paraffin wax and then subjected to the aforesaid cooling operation. The paraffin wax separated from the voltolization product may again be supplied to the voltolization treatment. If the cooling operation is carried out stepwise the paraffin wax may be obtained in the form of single fractions.

This method of operation will be further described by the following example.

Example 3

A voltolization product as obtained in the manner described in Example 2 is diluted at ordinary temperature with the double amount of benzine. The solution is then cooled to 0.° C. whereby paraffin wax is precipitated in an amount of 40 per cent of the said voltolization product. This paraffin wax is separated from the solution by filtering or centrifuging. The remaining solution is then distilled whereby benzine and middle oil are evaporated. The residue represents an oil having a viscosity of 16° Engler at 99° C.

We have also found that the crude voltolization products may be dissolved in solvents as for example ether or kerosene, whereupon such substances as acetone are added whereby the valuable constituents of the crude product are precipitated out.

This operation may be carried out as follows: The crude voltolization product is dissolved in a solvent, as for example ether, whereupon the pure voltolization product is precipitated by means of a precipitant, such as acetone. This treatment may also be effected in stages, whereby pure voltolization fractions having different viscosity may then be employed for improving lubricating oils while the fraction having the lower viscosity may be used as such as a lubricant. The said precipitation may also take place at a subatmospheric temperature, in which case the temperature may be lowered in stages. In this manner the paraffin wax present in the crude voltolization products is precipitated, after the precipitation of the valuable constituents of the said products, if desired in the form of two or more fractions having a different mean molecular weight, while the low boiling constituents formed during the voltolization remain dissolved in the solvent. The voltolization product may also be dissolved in other solvents and precipitated by other precipitants. Thus it may be dissolved in ether and precipitated by alcohol or dissolved in trichloroethane and precipitated by acetone.

The following example further illustrates this feature of our invention.

Example 4

A voltolization product as obtained according to Example 2 is dissolved in twice the amount of ether whereupon acetone is added in an amount half that of the ether in three equal portions. In this manner at first 20 per cent of the voltolization product are obtained as a substance having a viscosity of 30° Engler at 99° C., after the second addition 25 further per cent of a product having a viscosity of 20° Engler at 99° C. and after the third addition 25 per cent of a product having a viscosity of 8° Engler at 99° C. being precipitated. The portions precipitated in the single stages are removed from the body of solvent by decantation and then separated from adhering parts of the solvent, for example by distillation. The solution is then cooled to 10° below zero C. whereby paraffin wax is precipitated in an amount of 10 per cent of the initial voltolization products. The remaining solution is then separated by distillation into ether, acetone, middle oil and, in an amount of about 15 per cent of the voltolization product, a low boiling lubricating oil having a viscosity of 4° Engler at 99° C. The portions precipitated in the second and third stages are preferably mixed with a solvent, as for example benzine or trichloroethylene and then cooled to 10° below zero C. whereby in both cases about 15 per cent of paraffin wax are precipitated.

The crude voltolization products may also be subjected first to distillation, the distillation residue then being subjected after the addition of a diluent, to a cooling treatment. The residue may also be dissolved and then precipitated, if desired in stages, by means of a precipitant. Still another method consists in first hydrogenating the crude product and then subjecting it to a cooling operation, or first to dissolve the crude product, then precipitating it by means of a precipitant and finally purifying the precipitate thus obtained by dissolving it in a solvent and then precipitating it by cooling the resulting solution.

The products obtained according to the process of the present invention are either valuable lubricating oils or greases themselves or they are with great advantage used as pour depressants or for improving the temperature-viscosity curve of other lubricating oils.

As will be apparent from the foregoing description of our process of carrying through the voltolization and working up the crude reaction products, the products may vary widely in their properties.

Generally speaking it may be said that the voltolization products are mostly characterized by the following properties:

They have a viscosity index of between about 120 and 150, more particularly between 130 and 150, in preferred cases between 140 and 150. The viscosity at 99° C. ranges between 3 and 150° Engler or is even higher, as a rule between 9 and 80° Engler and more, usually between 12 and 60° Engler; the molecular weight determined in benzene ranges between 500 and 10000, as a rule between 600 and 5000 and more, usually between 800 and 2500; the specific gravity is about 0.86. The products contain between about 16 and 16.3 parts of hydrogen for each 100 parts of carbon, they have a Conradson carbon test of between 0.6 and 0.05, more usually between 0.4 and 0.1, a flash point between 280° and 330° C., and in any case above 300° C. if the viscosity at 99° C. is higher than 5, and a tar value below 0.4. Their color is from light yellow to dark yellow.

Thus for example a voltolization product which may be directly employed as a cylinder oil has a molecular weight between 800 and 1000, a viscosity between 5° and 10° Engler at 99° C., a viscosity index between 130 and 150, a carbon test between 0.4 and 0.6 and contains 16.4 parts of hydrogen for each 100 parts of carbon.

The voltolization products which may be added to lubricating oils for improving their properties as a rule have a molecular weight above 900, for example between 900 and 2000 or even higher and a viscosity, at 99° C., between 12° and 80° Engler, as for example 40° or 60° Engler. But also less viscous products having for example a viscosity between 4° and 10° Engler at 99° C. may be employed for the said purpose. The amount of the voltolization products added to the lubricating oils depends on the properties of these products and on the viscosity index to be imparted to the lubricating oil to be improved.

Crude voltolization products which are only freed from the low boiling constituents formed during the voltolization have the consistency of fats. When lubricating greases are to be prepared directly by the voltolization the treatment is continued until a viscosity at 99° C. of between 30° and 80° Engler or higher, such as of 50° Engler is attained. The resulting products have a solidification point of between 30° and 35° C. and a dropping point of about 30° C. These products may also be employed in admixture with other lubricating greases.

Generally speaking the voltolization products substantially improve the pour point of lubricants when added thereto in small amounts, and the temperature viscosity curve. i. e., the viscosity index when added in comparatively large amounts.

In addition to having the aforesaid properties, the products obtained from the said mixtures, especially from paraffin waxes of high molecular weight or their derivatives and hard or soft paraffin wax or oils rich in hydrogen containing the same, by voltolization treatment are excellent solid lubricants by themselves and it is not necessary to separate the unconverted or only partially converted substances from the crude voltolization products.

Turning now to the improvement of the viscosity index of lubricants by the addition of voltolization products, we have found that polymerization products prepared in the said manner and having a viscosity of more than 10°, preferably more than 12° Engler at 99° C. are particularly valuable in that by the addition even of small amounts thereof to lubricating oils having an unsatisfactory temperature-viscosity curve, a considerable improvement in the same is effected.

The advantage of this modification of our present invention resides in the fact that the improvement in the temperature-viscosity curves of any lubricating oils, especially of those having steep temperature-viscosity curves, is very considerable even by the addition of small amounts of the highly viscous condensation products. With large amounts of addition, there is only a slight further increase in the improvement.

These highly viscous products may also be prepared from a voltolization product of low viscosity by dissolving the latter in a solvent and then precipitating from the solution the higher viscous portion.

Also the voltolization products obtained from paraffin wax which has been separated from petrolatum in the manner described above have the valuable property of flattening the temperature-viscosity curve of lubricating oils when added thereto in amounts of from 0.5 to 10 per cent or more.

When separating paraffin wax or other waxes from hydrocarbon products containing the same, such as mineral oils, tars, products obtained by the extraction of coals or tars or by the destructive hydrogenation of carbonaceous materials of the nature of coals, tars and mineral oils, difficulties are often encountered in the mechanical separation of the precipitated constituents since the precipitate constitutes a smeary mass from which the solid portions can be separated only with difficulty. By the addition of small amounts of the voltolization products obtained as hereinbefore described the said solid portions may be easily separated from the body of oil.

An addition of voltolization products proves valuable not only when added to lubricants having a high pour point due to the presence of paraffin wax, but also in the case of hydrocarbon mixtures which contain crystallizable cyclic hydrocarbons which are soluble in oil.

Also in this case, the oil obtains a good mobility even at low temperatures. As initial oils may be mentioned for example tar oils or fractions thereof, especially coal tar oils containing naphthalene, anthracene and carbazole which crystallize out at low temperatures thereby rendering their employment troublesome. We have found that this crystallization is prevented by the said additions.

The following example will further illustrate this feature of the present invention.

*Example 5*

A tar fatty oil containing small amounts of anthracene and carbazole which has been obtained from coal tar oil by distillation has a setting point of 12° below zero C. By adding 1 per cent of a condensation product of paraffin wax prepared according to Example 2 the setting point is lowered to 20° below zero C.

We have also found that the highly viscous, oily product described above considerably improves the color of lubricating oils when it is added thereto. Furthermore the other properties of the lubricating oils, as for example the setting point and viscosity, may also be improved by the addition. An addition of a few tenths of one per cent is sufficient to impart to a non-fluorescent lubricating oil a strong fluorescence such as is frequently required in commerce. Of course also greater amounts of the said resinous products may be added if so desired.

An addition of vololization products proves valuable also in the case of lubricating greases (also known as consistent greases) as for example those used for driving gear, differential gear and similar apparatus, which in some cases become hard and stiff at comparatively low temperatures.

We have found that the plasticity and mobility of such lubricating greases at low temperatures is considerably improved by adding thereto synthetic products of the aforesaid kind, obtained by the treatment of hard or soft paraffin wax or derivatives thereof or montan wax, or substances containing the said products in considerable amounts, such as petrolatum, crude paraffin wax, petroleum jelly or crude lubricating oils containing paraffin wax or high molecular alcohols or esters, if desired in admixture with paraffin wax, with high voltage, preferably high frequency, electric currents.

Generally speaking it is preferable to add from 0.5 to 5 per cent of the synthetic products to the lubricating grease to be improved, but larger amounts, as for example 10 or 20 per cent or more may be employed. In the case of lubricating greases which are not to be used under extreme conditions an addition of less than 2 per cent, as for example 1 per cent is sufficient in some cases.

The synthetic products may be added to the lubricating greases either alone or in admixture with metal soaps, as for example lead, sodium or ammonium oleate or stearate, or with other substances, such as condensation products of organic acids of high molecular weight, or oxidized oil distillates of high boiling point.

The lubricating greases thus prepared have at low temperatures a better mobility, a smaller resistance to friction, a greater lubricating action, may be more readily pumped and cause a better engagement of the gears than the original grease. When employing the greases as gear greases, the gears are less worn and the temperature of the gear housing is not unnecessarily increased.

The voltolization products may also be very useful when added to lubricants in conjunction with other addition agents.

Thus we have found that oils containing hard or soft paraffin wax, especially lubricating oils, gear oils, lubricating greases and gear greases, are much improved by adding thereto small amounts of high molecular hydrocarbons which, even in small amounts, increase the viscosity and also such voltolization products as are capable of lowering the setting point. It has been found that the additions exerting effects in the different directions are not mutually injurious and in most cases the setting point, which is not influenced or only slightly influenced by the additions increasing the viscosity when added alone, is much improved and the viscosity index favorably influenced.

As oils containing paraffin wax may be mentioned especially those which have a high flash point, as for example Mid-Continent oils, Pennsylvanian oils, lubricating oils, still containing hard or soft paraffin obtained by destructive hydrogenation, or oils containing paraffin wax which have been treated with liquefied hydrocarbons which are gaseous at room temperature, with phenols, with sulphur dioxide or with other solvents or extraction agents.

In order to increase the viscosity and improve the temperature-viscosity curve, hydrocarbons having a molecular weight of more than 1000, preferably of more than 2000, are added to the said oils; these added hydrocarbons should have the property of exerting a favorable effect in this direction even when added in small amounts.

According to this feature of our invention there is also added to the improved oils a small amount, as for example from 0.5 to 10 per cent, of a voltolization product which lowers the setting point, most suitably such as is obtainable by the voltolization of hard or soft paraffin wax (as for example petrolatum) or of paraffins having a molecular weight of more than 330 or of acids of high molecular weight, preferably in the presence of cyclic hydrocarbons.

In this way oils can be obtained which have a low setting point and a viscosity index far above 100. Lubricating oils treated in the said manner may, by reason of their flat temperature viscosity curves and their good mobility at low temperatures, be employed both in summer and in winter.

In addition, our voltolization products also offer great advantages when adding the said substances to hydrocarbon mixtures other than lubricating oils, as for example to benzines, gas oil, illuminating oil and paraffin wax.

The advantages of the process in the case of liquid hydrocarbons consist in the facts that their viscosity is increased and a better capacity for being pumped and a smaller consumption are ensured. Furthermore when adding the said voltolization products to motor fuels the valves in the combustion space of the motor are continually lubricated and the piston rings are more tightly connected with the cylinders. In the case of paraffin wax the viscosity of its melt is increased and after cooling no cracks appear or, in cases when they do appear, they rapidly disappear again.

Voltolization products may also be used for special purposes, as for example when for the operation of aeroplane engines, highly sensitive automobile engines and the like, lubricating oils having a viscosity index of more than 120, a flash point of more than 230° C., a Conradson coke test of less than 1, a viscosity of from 2° to 3.5° Engler at 99° C. and in some cases a setting point of lower than 10° below zero C., are required. The preparation of such lubricating oils is, however, very troublesome and expensive by the usual methods.

We have found that lubricating oils having the said properties are obtained in a comparatively simple manner by adding to lubricating oils obtained by the destructive hydrogenation of paraffin basic mineral oils or fractions thereof of high boiling point, the condensation products obtainable by the voltolization of hard or soft paraffin waxes.

As the first-mentioned component may be mentioned especially destructive hydrogenation products of Pennsylvanian, and also, if desired, of Mid-Continent, oils especially their lubricating oil fractions. For example lubricating oil fractions having a viscosity index of from 80 to 110, especially from 100 to 110, a viscosity of from 2° to 8° Engler, at 99° C., especially of from 2.5° to 6° Engler at 99° C., a coke test of more than 0.5, especially of more than 1, and a flash point of from 200° to 320° C., especially of from 230° to 290° C., may be subjected to destructive hydrogenation. In this way a lubricating oil is obtained having a viscosity of from 2° to 3° Engler at 99° C., a viscosity index of from 100 to 120, advantageously from 110 to 120, a coke test of from 0.05 to 0.5 and a flash point of from 200° to 300° C., especially of from 220° to 300° C. To such a lubricating oil, one of the said voltolization products is added in an amount of from 2 to 30 per cent by weight, especially of from 5 to 15 per cent if they have a viscosity of from 6° to 100° Engler at 99° C., especially of from 10° to 60° Engler at 99° C., a viscosity index of from 125 to 150, especially of from 130 to 140, a flash point of 280° C. or more, especially of from 280° to 320° C. and a coke test of from 0.3 to 0.2, especially of from 0.3 to 0.1.

These products may also be employed in admixture with hydrogenation products of rubber or of polymerization products of diolefines, such as butadiene, or of cyclo rubber or resins free from oxygen or of polymerization products of olefines, such as isobutylene.

The voltolization products together with the paraffin wax contained in the crude product or after separation thereof may be employed in admixture with a white oil of any desired viscosity, for example with paraffinum liquidum for pharmaceutical or cosmetic purposes. In this case the said products may also be stirred with small amounts of water or preferably purified before use.

The voltolization products may also be employed together with water as lubricants.

It should be noted that whenever in the foregoing examples we have spoken simply of parts, what we mean thereby is parts by weight.

This application is a division of our copending application Ser. No. 177,745, filed December 2, 1937 now U. S. Patent No. 2,197,769, issued April 23, 1940, which in turn is a division of our copending application Ser. No. 651,802, filed January 14, 1933, now U. S. Patent No. 2,197,768, issued April 23, 1940, wherein the various ways of applying our improved voltolization products are described in greater detail with the aid of specific examples.

While in the foregoing we have explained our invention by reference to specific examples, we wish it to be understood that our invention is not in any way limited to these specific examples, the scope of our invention being defined in the appended claims.

What we claim is:

1. The process for producing lubricants and products suitable for improving lubricants from aliphatic waxy material which comprises, subjecting said material to the action of a silent electric discharge for a time sufficient to form condensation products having a viscosity of at least 3° Engler at 99° C. and being soluble in hydrocarbon lubricating oils, diluting the thus treated material with a light hydrocarbon solvent, cooling the solution formed to a temperature between about −8° and −30° C., thereby precipitating paraffin wax, separating said wax from the solution and recovering the desired products from the wax-free solution.

2. The process for producing lubricants and products suitable for improving lubricants from aliphatic waxy material which comprises, subjecting said material to the action of a silent electric discharge for a time sufficient to form condensation products having a viscosity of at least 3° Engler at 99° C. and being soluble in hydrocarbon lubricating oils, dissolving the thus treated material in a selective solvent, adding to the solution formed a precipitant for the condensation products in stages of such succession as to successively precipitate condensation products of different viscosities, separating the precipitate from the solution and recovering the desired products from the separated precipitate.

3. A process as claimed in claim 2 which comprises, cooling the solution remaining after the precipitation of the condensation products to a sub-atmospheric temperature so as to precipitate paraffin wax.

4. The process for producing lubricants and products suitable for improving lubricants from aliphatic waxy material which comprises subjecting said material to the action of silent electric discharge for a time sufficient to form condensation products having a viscosity of at least 3° Engler at 99° C. and being soluble in hydrocarbon lubricating oils, mixing this thus treated material with a selective solvent, adding to the solution a material for precipitating from the mixture portions of relatively low solubility in the solvent used while maintaining portions of high solubility dissolved, separating said portions of relatively low solubility, cooling the resultant solution to precipitate paraffin wax therefrom, and recovering the desired product from the wax-free solution.

5. The process for producing lubricants and products suitable for improving lubricants from aliphatic waxy material which comprises, subjecting said material to the action of a silent electric discharge for a time sufficient to form condensation products having a viscosity of at least 3° Engler at 99° C. and being soluble in hydrocarbon lubricating oils, diluting the thus treated material with a selective solvent, cooling the solution formed to a temperature between about −8° and −30° C., thereby precipitating paraffin wax, separating said wax from the solution and recovering the desired products from the wax-free solution.

MATHIAS PIER.
FRIEDRICH CHRISTMANN.